Oct. 18, 1966    D. H. SHEFFIELD ET AL    3,280,275
MULTICIRCUIT SELECTOR SWITCH WITH GUIDE MEANS
Filed Nov. 30, 1964                          2 Sheets-Sheet 1
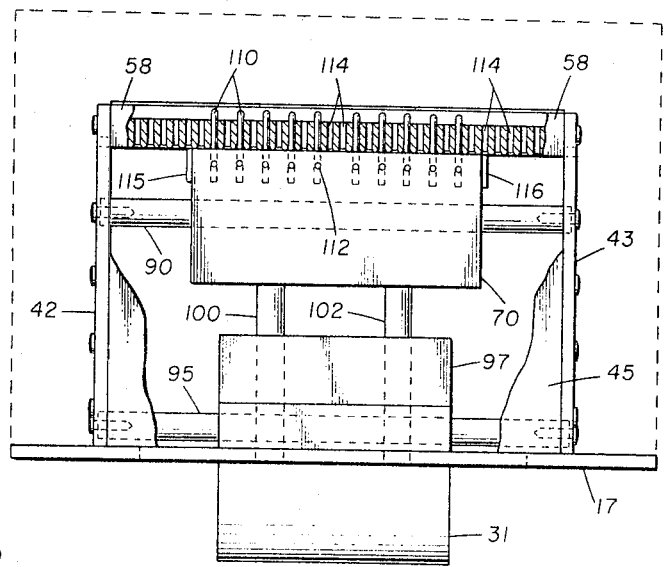
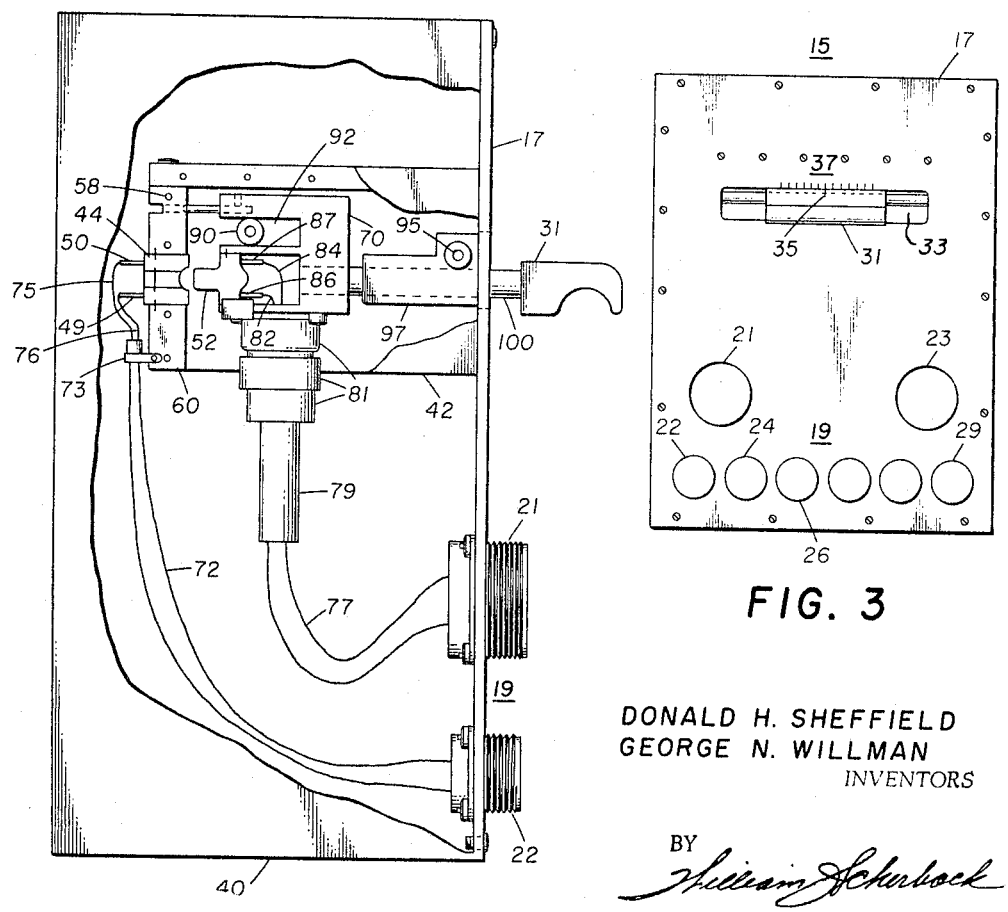
DONALD H. SHEFFIELD
GEORGE N. WILLMAN
INVENTORS
BY
*William Schurbock*

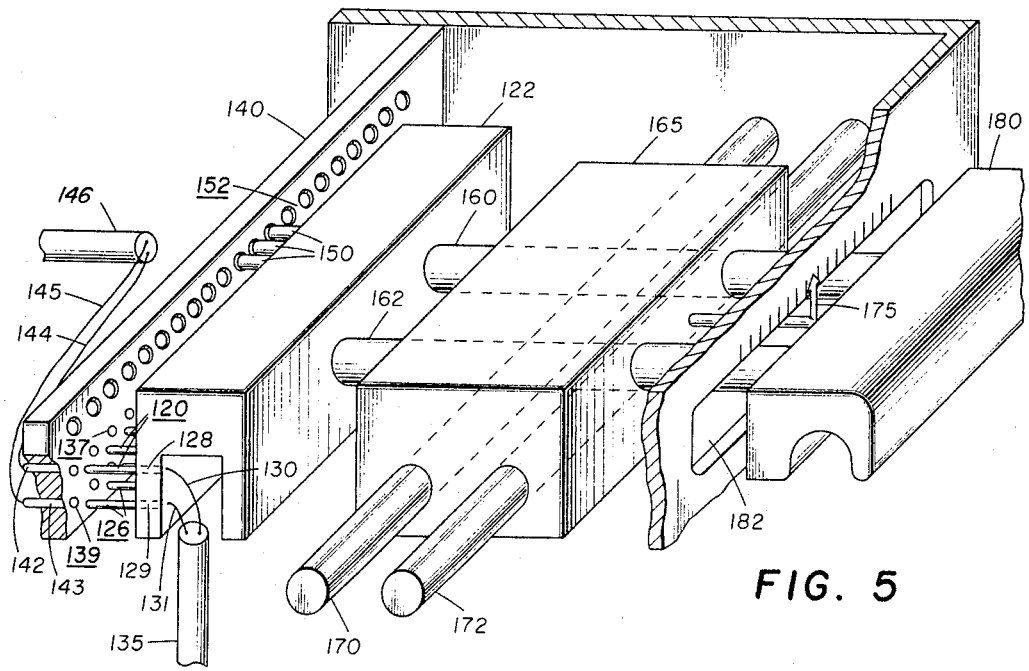

United States Patent Office

3,280,275
Patented Oct. 18, 1966

3,280,275
MULTICIRCUIT SELECTOR SWITCH WITH
GUIDE MEANS
Donald H. Sheffield, Farmers Branch, and George N. Willman, Dallas, Tex., assignors to Mobil Oil Corporation, a corporation of New York
Filed Nov. 30, 1964, Ser. No. 414,734
13 Claims. (Cl. 200—16)

This invention relates to electrical switching wherein several circuits are selected from a multiplicity of input circuits for connection to a utilization device, and especially to an electrical switch unit for engaging several mating contacts with selected ones of a multiplicity of fixed contacts with minimum contact wear and lead wire breakage.

In recent years, there have been developed many techniques in seismic exploration for delineating the same subsurface reflecting interfaces using several different source-to-detector spacings. After being corrected for geometrical and geological differences, the recorded traces covering the same interfaces but made with the different source-to-detector spacings are composited with the same time reference to give a single enhanced trace. The reasons for compositing several signals obtained with different source-to-detector spacings may be to improve the signal-to-noise ratio, to eliminate multiple reflections, or other reasons. Since the same subsurface reflecting interfaces downward in a particular direction are covered by several recorded traces, the technique may be aptly referred to as multiple coverage seismic exploration.

In one method of multiple coverage known in the art as the "roll along" method, three separate geophone cables are laid out along a straight-line traverse in the field. Each cable has spaced at equal increments along its length, patches of geophones or recording stations, usually twelve in number. Thus, there are thirty-six recording stations laid out along the traverse. These recording stations may be referred to as having numbers 1 to 36, numbering consecutively from the end of one cable. As in the conventional manner, twenty-four traces are to be recorded using recording stations Nos. 1 through 24. A seismic source, such as a weight-dropping truck or dynamite, is located at a certain offset distance along the traverse from recording station No. 1. With the recording equipment conditioned to record separately the signals received at recording stations Nos. 1 through 24, the seismic energy is imparted to the earth to travel downwardly to reflecting subsurface interfaces and then back up to the recording stations.

For the next recording, recording stations Nos. 2 through 25 are to be used; and the seismic source moves up a distance equivalent to the recording station spacing. Another recording is made of the reflected seismic energy. For a third recording, recording stations Nos. 3 through 26 are used. This process of sequentially picking up one recording station and leaving off another for recording as the seismic source moves up one station spacing continues until a record is produced from recording stations Nos. 13 through 36. Next, the unused cable comprising recording stations Nos. 1 through 12 may be picked up and transferred along the traverse to a position ahead of recording station No. 36. The sequence of operation may then repeat itself.

In the past, several pieces of apparatus were used to select the twenty-four recording stations to be used for recording. In one instance, a telephone switchboard type patch panel was used inside the recording truck to obtain the circuits for recording the proper traces. Not only was the patch panel method laborious for the operator to reconnect between recordings, but also the repeated manual connections and disconnections caused the frequent breaking of lead wires and constant wear of contact surfaces. In another instance, a commercially available rotary-type switch was used; but there was considerable contact wear and frequent open circuiting between contacts. Further, since the conventional rotary switches had thirty-six separate wafers and associated wiper arms, with each wafer having twenty-four contacts, the switch was bulky and difficult to repair. Sometimes, bending in the wiper arm rotating shaft prevented all the wiper arms from making exactly the same contact positions.

It is an object of the present invention to provide a switch for engaging and disengaging several linearly arranged mating contacts with a multiplicity of linearly arranged fixed contacts in multiple combinations using guiding means for directing the mating contacts to move in a controlled direction to reduce wear and assure reliability.

In accordance with the present invention, there is provided a switch for selecting circuits from a first group of circuits for application of signals to a second group of circuits. The switch comprises $n$ sets of linearly arranged fixed contacts for electrical connection to one of the groups of circuits, where $n$ is a positive integer; and $k$ sets of linearly arranged mating contacts are provided for electrical connection to the other of the groups of circuits. The fixed set of contacts is engageable with the mating set of contacts in selected ones of $|n-k|+1$ combinations, where $k$ is a positive integer and $k \neq n$. The mating contacts are mounted on means supported for movement in direction along and toward and away from the fixed contacts. A guide means is also provided and made limited in movement to a direction along the fixed contacts. Means, extending through the guide means, is fixed to the mounting means for directing the mating contacts into and out of selected engagement with the fixed contacts.

In a preferred embodiment, the mounting means is a block or carriage, and its supporting means is a guide rod extending in direction along the fixed contacts.

In another feature of the present invention, the mating contacts, numbering less than the fixed contacts, are positively aligned with the fixed contacts by spaced aligning pins secured to the mounting means and extending in direction beyond ends of the mating contacts.

For other objects and advantages of the present invention, reference may now be had to the following detailed description and accompanying drawings in which:

FIGURE 1 is a cut-away side view of the electrical switch unit with the left side panel of the supporting assembly removed;

FIGURE 2 is a top view with the switch housing removed and the top panel of the supporting assembly cut away;

FIGURE 3 is a front elevation showing the front panel;

FIGURE 4 is an enlarged oblique view of the fixed contacts, the mating contacts, and the aligning pins and apertures; and FIGURE 5 illustrates another embodiment of the present invention.

Referring now to FIGURE 3, there is shown a front elevation of an electrical switch unit 15 having a front panel 17 and a plurality of multichannel input connectors 19. Electrical switch unit 15, in the illustrated embodiment, serves the purpose of selecting twenty-four geophone recording stations for recording on a multichannel recording system from thirty-six geophone recording station circuits. The thirty-six geophone inputs are connected to the unit 15 by way of multichannel input connectors 19. Six separate geophone inputs are connected to each of the connectors 19. Twelve circuit channels from output connector 21 are available for connection to a utilization device, which may be a recording system. In such event, the channels would be connected to a first series of amplifiers and from there to twelve side-by-side magnetic recording heads positioned above a moving magnetic recording medium, all in a manner common to the seismic art. Twelve additional channels from connector 23 similarly would be connected by cable means to a second series of twelve amplifiers and from there to twelve magnetic recording heads placed adjacent to the first series of recording heads.

An operator may select which twenty-four of the thirty-six input channels are to be connected to the associated connectors 21 and 22 merely by moving handle 31 longitudinaly along slot 33. For example, for a first recording, the operator pulls handle 31 away from the front panel 17 to disengage internal switch contacts, slides the handle to the left end of the slot 33 so that index 35 lines up with the first position marker from the left. He then pushes handle 31 toward the front panel 17 to effect the engagement of selected switch contacts as will be described hereinafter. For a second recording, the operator again pulls handle 31 away from panel 17, moves handle 31 along slot 33 until index marker 35 lines up with the second position marker from the left, and then he again pushes handle 31 toward front panel 17 to effect the engagement of certain internal contacts and connects a second series of twenty-four geophone recording station circuits to connectors 21 and 23. By use of handle 31, an operator may effectively pick up a series of twenty-four geophone recording stations and move them as a unit a certain spacing along the exploration traverse. Each of the index markings 37 indicates an increment of one recording station spacing; thus, the operator may move the group of twenty-four recording stations one station spacing between recordings, two, or whatever incremental distance is desired for the type of multiple coverage seismic exploration being done.

Referring now to FIGURE 1, there is shown a partial cross-sectional view of electrical selector switch unit 10 with housing 40 and side panel 42 cut away to show the interior of the switch unit 15. A fixed contact assembly 44 contains a multiplicity of contacts spaced along its length and is mounted between supporting panels 58 and 60. The contacts are connected by way of multiconductor cables, one of which, the cable 72, is shown, to the input connectors 19. A mating contact assembly 52, comprised of a plurality of mating contacts, is secured to a mounting means 70 which in turn is supported on a guide rod 90 extending in direction along the length of the fixed contact assembly 44. The guide rod 90 is received in a first slotted portion 92 of mounting means 70 and in cooperation therewith permits movement of the mounting means 70 in direction along and toward and away from the fixed contact assembly 44.

A guiding means comprised of slide block 97 and a second guide rod 95 is provided to aid in controlling the movement of the mounting means 70 and the mating contact assembly 52 relative to the fixed contact assembly 44. The slide block 97 is limited to movement in direction along the fixed contacts and has passing therethrough a pair of rods or plungers 100, 102, better viewed in FIGURE 2, one end each of which is secured to the mounting means 70. Movement of the rods 100, 102 relative to the block 97 will move the contact assemblies into and out of engagement one with the other.

Positioning of the mating contact assembly 70 relative to the fixed contact assembly 44 is facilitated by handle 31 secured to the ends of rods 100, 102 extending through the slot in the front panel 17.

The structural elements and relationship as above described provide a precise relationship between the contact assemblies 44 and 52, enabling with ease the selection of geophone circuits for recording while reducing to a minimum, wear and damage to contact elements during selection and engagement and disengagement.

To provide easy selection of the contacts to be engaged and to prevent contact breakage and jamming, a plurality of aligning pins 110, illustrated in FIGURE 2, are provided extending outwardly from the rear of mounting block 70 perpendicular to the face of upper contact supporting panel 58. Aligning pins 110 are mounted in apertures drilled in the rear of mounting block 70 and are held by set screws 112. A plurality of aligning apertures 114 receive the aligning pins 110 to guide the mating contacts into proper relationship with the fixed contacts. The aligning pins 110 engage with the aligning apertures 114 prior to the engagement of the mating contacts and the fixed contacts so that positive alignment of the contacs is obtained. As handle 31 is pulled away from front panel 17, the unshown contacts are constrained to disengage in the preferred direction of minimum wear by the action of plungers 100 and 102 moving through apertures in slide block 97 and mounting block 70 moving away from the upper contact supporting panel 58 on guide rod 90. Slide block 97 is limited to movement only along guide rod 95, while mounting block 70 is movable on guide rod 90 in a direction perpendicular to the upper contact supporting panel 58 or along guide rod 90.

In case there is some wiggle or instability in the mechanism for engaging and disengaging the mating contacts, aligning pins 110, fitting snugly in aligning apertures 114, insure that the mating contacts are not removed in an askew direction. It should be noted that guide rods 90 and 95 are countersunk into side supporting panels 42 and 43 to make sure that there is little wiggling of the rods. The side supporting panel 42, side supporting panel 43, and the top supporting panel 45 (shown cut away) may be referred to collectively as the supporting assembly.

Once handle 31 has been pulled away from front panel 17 sufficiently that aligning pins 110 clear aligning apertures 114, handle 31 may be moved along the unshown slot to select other contacts to be engaged and thus other output circuits. Bumpers 115 and 116 are provided to prevent mounting block 70 from over-shooting the end contact of the row of fixed contacts. By means of bumpers 115 and 116, mounting block 70 is stopped at either side panel 42 or side panel 43 in exactly the right position for the end mating contact to engage the end fixed contact.

Referring again to FIGURE 1, it is seen that the geophone recording station circuits connectable to multichannel connector 22 are transmitted to their respective fixed contacts by way of cable 72 held fastened to lower supporting panel 60 by fastener 73. A pair of leads 75 and 76 are shown connected, respectively, to terminals 50 and 49. The pair of leads 75 and 76 represent the two wire circuits for one geophone recording station. It will be readily apparent that the two wire leads from the other recording station circuits are connected in a similar manner to the remainder of the terminals associated with the fixed contacts.

It should be noted that terminals 50 and 49 correspond with a set of two fixed contacts on directly opposite sides of the slot in fixed contact assembly 44. Thus, each input circuit is connected to an upper and a lower fixed contact. The output channels for connection through multichannel connector 21 are transferred to the respective mating contacts by way of cable 77, through a flexible rubber sleeve 79 and a conduit 81. A pair of leads 82 and 84 are shown connected, respectively, to terminals 86 and 87, each terminal associated with an upper and a lower mating contact. Leads 82 and 84 comprise a single output channel. It will be readily apparent that the remainder of the two-wire output channels are connected to the remainder of the sets of mating contacts. Twelve output channels are contained in cable 77. Multichannel connector 22 (FIGURE 3) has a similar connection.

Referring now to FIGURE 4, the fixed contact assembly 44 is shown containing a multiplicity of spring contacts, referred to as the fixed contacts, spaced inside a slot 45. Although only the bottom row of contacts 46 is visible, there is a similar row of fixed contacts 47 along the upper side of slot 45. Each of the fixed contacts 46 and 47 has connected at the rear of fixed contact assembly 44 associated electrical terminals. Contact 48, at the end of the row of contacts, is shown to have rear terminal 49. The contact directly above contact 48 is shown to have terminal 50. Likewise, each and every contact in the rows of contacts 46 and 47 has connected a terminal at the rear of fixed contact assembly 44, each contact and associated terminal being insulated from every other contact and associated terminal.

Shown adjacent fixed contact assembly 44 is a mating contact assembly 52 having an upper row of bayonet contacts 53, referred to as the mating contacts, mounted on the upper side of an outwardly extending rib 54 and a lower row of contacts 56 (not visible) mounted on the underside of rib 54. Since the separate contacts in the four rows of contacts 46, 47, 56, and 53 are spaced at equal increments, the sets of contacts are engageable in several mating relationships. As mating contact assembly 52 is pushed forward into fixed contact assembly 44, the row of mating contacts 53 engage and force slightly upward the row of fixed contacts 47. Likewise, the row of mating contacts 56 engage and force slightly downward the row of fixed contacts 46. The tension exerted by the upper row of fixed contacts 47 downward is balanced by the tension exerted upward by the lower row of contacts 46. When mating contact assembly 52 is fully engaged with fixed contact assembly 44 in any position, the engaged sets of contacts close a circuit between their respective terminals.

Mating contact assembly 52 and fixed contact assembly 44 are commercially available devices available from the Amphenol Electronics Corporation, 1830 South 54th Avenue, Chicago 50, Illinois. Assembly 44 is a No. 26–4200–24S. Assembly 52 is a No. 26–4100–24P. The entire mating contact assembly 52 is composed of two standard assemblies placed end-to-end with the mounting flanges cut off, each plug having two rows of twelve contacts each. The entire fixed contact assembly 44 is composed of three standard assemblies with the end flanges cut off, each plug having two rows of twelve spring contacts each. Assembly 44 is held between upper supporting panel 58 and lower supporting panel 60 by means of key slots 62 and 64, with a ribbonlike key along the length of the assembly. Likewise, assembly 52 is held between a lower supporting member 66 and an upper supporting member 68 of mounting block 70.

Still in FIGURE 4, the aligning apertures 114 are shown to be slightly countersunk so that the rounded ends of the aligning pins 110 fit easily into the apertures 114. It is very desirable to use a plurality of aligning pins rather than a single large pin. With several aligning pins, the shaft of each pin gets a grip on the inside of the aligning apertures before much penetration is required. Also, several aligning pins insure that mounting block 70 does not wiggle in a plane parallel to the upper contact supporting panel 58. In short, the aligning pins 114 protect against any looseness or misalignment in the mechanism for moving mounting block 70 in the direction to engage mating contacts 53 with fixed contacts 47 and mating contacts 56 with fixed contacts 46, all with minimum contact wear.

Ordinarily, the direction for engaging plug-in type contacts with minimum contact wear is parallel to the longitudinal axis of each contact. Thus, for the spring fixed contact, of the preferred embodiment, to be engaged with minimum wear, the longitudinal axis of the mating contact must engage the fixed contact in a direction along the longitudinal axis of the fixed contact. For other types of contacts, there is an optimum direction for the moving mating contact to meet the fixed contact. For sliding-type contacts, the optimum direction of engagement includes sliding along a straight-line path with no wiggling or sideways motion. The rectilinear path of engagement is especially desirable for banana-type or phone jack type plugs.

It is obvious that for minimum wear, the longitudinal axes of the fixed contacts must be mounted mutually parallel so that the sets of mating contacts, whose longitudinal axes must also be parallel, can engage simultaneously the selected adjacent sets of fixed contacts in multiple relationships, each relationship or position causing minimum contact wear. For planar face-type contacts, the flat faces of all the fixed contacts should form a plane. For rounded-type contacts, the planes tangent at the point of desired contact should lie in a single plane.

Now that there has been a description of the preferred embodiment of the present invention, reference is now made to FIGURE 5 where there is shown an alternate embodiment. The fixed contacts in this embodiment consist of an upper row of sockets 137 mounted insulatably on a first linear axis on the contact supporting panel 140 and a lower row of sockets 139 mounted insulatably on a second linear axis parallel to the first. The longitudinal axes of all of the sockets are mutually parallel. The two end sockets 142 and 143 of each row are shown connected, respectively, to the two wires 144 and 145 of a two-wire single input circuit. It will be readily apparent that the other sets of sockets, one above the other, are connected to single circuits whose conductors are contained in cable 146. An upper row of pin contacts 120 is mounted insulatably on mounting block 122 at equal increments on a first linear axis. A lower row of pin contacts 126 is similarly mounted on a second linear axis parallel to the first linear axis. The longitudinal axes of all the pin contacts are mutually parallel. The two end pins 128 and 129 of each row are shown connected, respectively, to the two wires 130 and 131 of a single output circuit. It will be readily apparent that the conductors for other circuits contained in cable 135 and are similarly connected to the remainder of the pin contacts of each row.

The aligning pins 150 and aligning apertures 152 operate as previously described in the preferred embodiment. The movement of mounting block 122 in a direction parallel to the longitudinal axes of the fixed contact sockets 137 and 139 by means of plungers 160 and 162 is the same as hereinabove described. However, the movement of mounting block 122 longitudinally of the fixed contacts is different. A slide block 165 is mounted on both the guide rods 170 and 172 and limited to movement only along the axial length of the guide rods 170 and 172. A pointer 175 is provided attached to slide block 165 to indicate the longitudinal position of the mating contacts 120 and 126 along the fixed contacts 137 and 139. As handle 180 is moved along slot 182, slide block 165 moves slidably on guide rods 170 and 172. As before, guide rods 170 and 172 are mounted parallel to the linear axes of the fixed contacts 137 and 139.

While a preferred and an alternate embodiment of the present invention have been described, it is to be understood that modifications may now suggest themselves to those skilled in the art and it is intended to cover such modifications as fall within the scope of the appended claims.

What is claimed is:

1. A switch for selecting circuits from a first group of circuits for application of signals to a second group of circuits, said switch comprising:
   (a) a plurality of linearly arranged fixed contacts for electrical connection to one of the groups of circuits,
   (b) a plurality of linearly arranged mating contacts for electrical connection to the other of the groups of circuits, (c) means mounting said mating contacts, (d) means for supporting said mounting means for movement in a plane defined by said fixed contacts and said mating contacts, (e) a guide means movable in direction only along said fixed contacts, and (f) means extending slidably through said guide means and fixed to said mounting means for directing said mating contacts into and out of selected engagement with said fixed contacts.

2. A switch for selecting groups of circuits from a plurality of input signal circuits for application of signals to a utilization device, said switch comprising:

(a) a plurality of linearly arranged fixed contacts for electrical connection to an equal number of separate input circuits, (b) a plurality of linearly arranged mating contacts in number less than the number of fixed contacts for electrical connection to the utilization device, (c) means mounting said mating contacts, (d) means for supporting said mounting means for movement in a plane defined by said fixed contacts and said mating contacts, (e) a guide means movable in direction only along said fixed contacts, and (f) means extending slidably through said guide means and fixed to said mounting means for directing said mating contacts into and out of engagement with selected ones of said fixed contacts.

3. A switch as in claim 2 wherein there is provided a means for positively aligning said mating contacts opposite said fixed contacts prior to engagement of the contacts.

4. A switch as is claim 2 wherein said means for supporting said mounting means is a first guide rod extending in direction along said fixed contacts.

5. A switch as in claim 2 wherein said means mounting said mating contacts comprises a block with a first slot having said mating contacts mounted therein and a second slot having said means for supporting passing therethrough.

6. A switch as in claim 2 wherein said guide means comprises a second guide rod and a slide block mounted thereon.

7. A switch as in claim 2 wherein said means extending through said guide means and fixed to said mounting means comprises two parallel plunging rods.

8. A switch as in claim 2 wherein there is provided a means carried by said guide means for visually indicating the position of said mating contacts along said fixed contacts.

9. A switch as in claim 5 wherein there is provided a means for positively aligning said mating contacts opposite said fixed contacts prior to engagement of the contacts and comprising a plurality of spaced aligning pins secured to said mounting means and extending in direction beyond said mating contacts.

10. An electrical selector switch comprising in combination:

(a) a housing, (b) a front panel attached to said housing, (c) a supporting assembly attached to the inside of said front panel, (d) a contact supporting panel mounted in said supporting assembly, (e) a multiplicity of sets of fixed contacts mounted on said contact supporting panel at equal intervals on at least one linear axis parallel to a straight line of said contact supporting panel, the longitudinal axes of said sets of fixed contacts being mutually parallel, (f) a multiplicity of input channels for connection to external circuits, individual ones of said input channels being electrically connected to individual ones of said sets of fixed contacts, (g) a mounting block, (h) a means for supporting said mounting block for movement in a plane defined by said linear axis and said longitudinal axes of said fixed contacts, (i) a multiplicity of sets of mating contacts, less in number than the number of sets of fixed contacts, mounted on said mounting block and engageable with any selected adjacent ones of said sets of fixed contacts, said sets of mating contacts being spaced on said mounting block at intervals equal to the spacing of said sets of fixed contacts, (j) a multiplicity of output channels for connection to other external circuits, individual ones of said output channels being electrically connected to individual ones of said sets of mating contacts, (k) a slide block spaced from said mounting block, (l) means for constraining said slide block for movement parallel to said linear axis of said sets of fixed contacts, (m) plunging means attached to said mounting block for moving said sets of mating contacts in a direction parallel to said longitudinal axes of said sets of fixed contacts whereby said sets of mating contacts engage and disengage selected adjacent ones of said sets of fixed contacts with minimum stress and wear, said plunging means passing slidably through said slide block and extending through a slot in said front panel, (n) a means for positively aligning said sets of mating contacts longitudinally of said sets of fixed contacts prior to engagement, (o) a handle attached to said plunging means in front of said front panel such that movement of said handle along said slot selects the input channels for connection to said output channels and movement of said handle toward and away from said front panel engages and disengages said sets of mating contacts with selected adjacent ones of said sets of fixed contacts, and (p) means for visually indicating the longitudinal position of said sets of mating contacts along said sets of fixed contacts.

11. An electrical selector switch comprising in combination:

(a) a housing, (b) a front panel attached to said housing, (c) a supporting assembly attached to the inside of said front panel, (d) a contact supporting panel mounted in said supporting assembly, (e) a multiplicity of sets of fixed contacts mounted at equal intervals on at least one linear axis parallel to a straight line in said contact supporting panel, the longitudinal axes of said sets of fixed contacts being mutually parallel, (f) a multiplicity of input channels for connection to external circuits, individual ones of said input channels being electrically connected to individual ones of said sets of fixed contacts, (g) a first guide rod spaced from said sets of fixed contacts and mounted in said supporting assembly parallel to said linear axis of said sets of fixed contacts, (h) a mounting block mounted on said first guide rod and limited to movement along said guide rod and parallel to the linear axes of said sets of fixed contacts, (i) a multiplicity of sets of mating contacts, less in number than the number of said sets of fixed contacts, mounted on said mounting block and engageable with selected adjacent ones of said sets of fixed contacts, said sets of mating contacts being spaced on said mounting block at intervals equal to the spacing of said sets of fixed contacts, (j) a multiplicity of output channels for connection to external circuits, individual ones of said output channels being electrically connected to individual ones of said sets of mating contacts, (k) a second guide rod mounted in said supporting assembly parallel to said first guide rod and spaced therefrom, (l) a slide block mounted on said second guide rod and limited to movement only along said second guide rod, (m) two parallel plungers rigidly attached to said mounting block in a direction parallel to said longitudinal axes of said sets of fixed contacts, passing slidably through said slide block, and protruding through a slot in said front panel, said two parallel plungers movable in a direction whereby said sets of mating contacts engage and disengage with selected adjacent ones of said sets of fixed contacts with minimum contact wear and stress, (n) a plurality of aligning pins mounted on said mounting block and extending outwardly parallel to said longitudinal axes of said sets of fixed contacts, (o) means on said contact supporting panel for receiving said aligning pins to guide said sets of mating contacts into engagement and disengagement with selected adjacent ones of said sets of fixed contacts, (p) a handle attached to said two parallel plungers in front of said front panel such that a movement of said handle along said slot selects the input channels for connection to said output channels and a movement of said handle toward and away from said front panel engages and disengages said sets of mating contacts with selected adjacent ones of said sets of fixed contacts, and (q) means for visually indicating the longitudinal position of said sets of mating contacts along said sets of fixed contacts.

12. A switch for selecting circuits from a first group of circuits for application of signals to a second group of circuits, said switch comprising:

(a) plurality of linearly arranged fixed contacts for electrical connection to one of said groups of circuits, (b) a mounting means, (c) a plurality of linearly arranged mating contacts for electrical connection to the other of said groups of circuits, said mating contacts being mounted on said mounting means, (d) guide means movable in direction only along said fixed contacts, said guide means comprising at least two supporting elements extending in direction along said fixed contacts, said supporting elements being spaced apart in the engaging direction of said fixed contacts, and (e) plunging means extending slidably through said guide means and fixed to said mounting means for directing said mating contacts into and out of selected engagement with said fixed contacts.

13. A switch for selecting circuits from a first group of circuits for application of signals to a second group of circuits comprising:

(a) a front panel including a slot, (b) a supporting assembly attached to the inside of said front panel, (c) a plurality of linearly arranged fixed contacts mounted in said supporting assembly, said fixed contacts for electrical connection to one of the groups of circuits, (d) a plurailty of linearly arranged mating contacts for electrical connection to the other of the groups of circuits, and (e) guide means operable from the outside of said front panel for selecting contact-engaging positions while said mating contacts are spaced from said fixed contacts and for directing said contacts into and out of engagement, said guide means including mounting means adjacent said slot, said mating contacts being slidably mounted on said mounting means for selection of contact-engaging positions while said mating contacts are spaced from said fixed contacts, and supporting means for constraining said mounting means to move toward and away from said fixed contacts in a single plane defined by said fixed contacts and said mating contacts.

References Cited by the Examiner
UNITED STATES PATENTS

| 2,701,541 | 2/1955 | Miller et al. | 200—167 X |
|---|---|---|---|
| 3,121,143 | 2/1965 | Landry et al. | 200—11 |
| 3,170,049 | 2/1965 | Clavel | 200—6 X |
| 3,187,120 | 6/1965 | Akst | 200—16 |

References Cited by the Applicant
UNITED STATES PATENTS

| Re. 24,586 | 1/1959 | Davis. |
|---|---|---|
| 1,549,211 | 8/1925 | Palevich. |
| 2,487,199 | 11/1949 | Titcomb. |
| 2,510,944 | 6/1950 | Auerbach. |

ROBERT K. SCHAEFER, *Primary Examiner.*

KATHLEEN H. CLAFFY, *Examiner.*

J. R. SCOTT, *Assistant Examiner.*